July 28, 1970  J. S. JOHNSTON  3,521,670
DIGITIZERS FOR FLUID LOGIC SYSTEMS
Filed Oct. 21, 1968  2 Sheets-Sheet 1
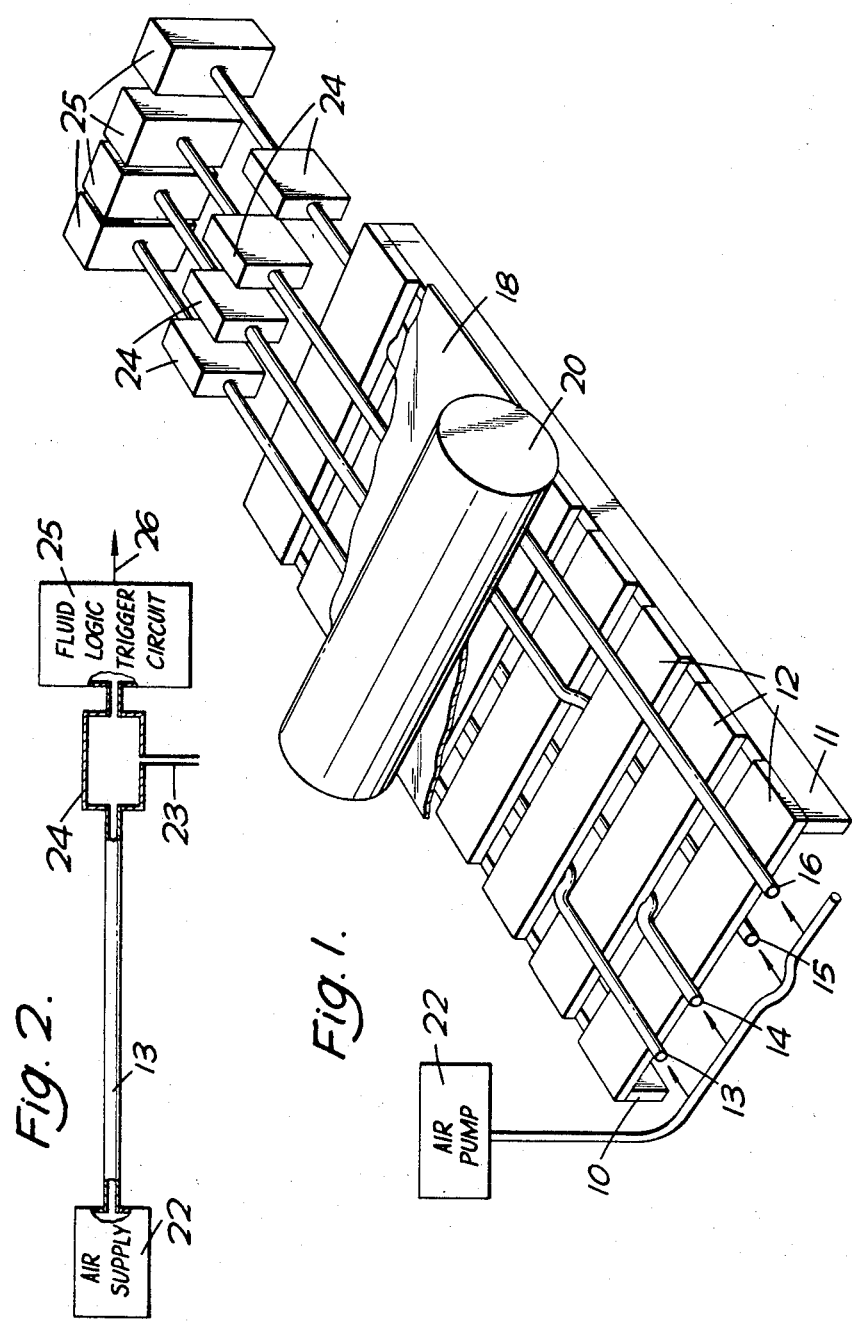

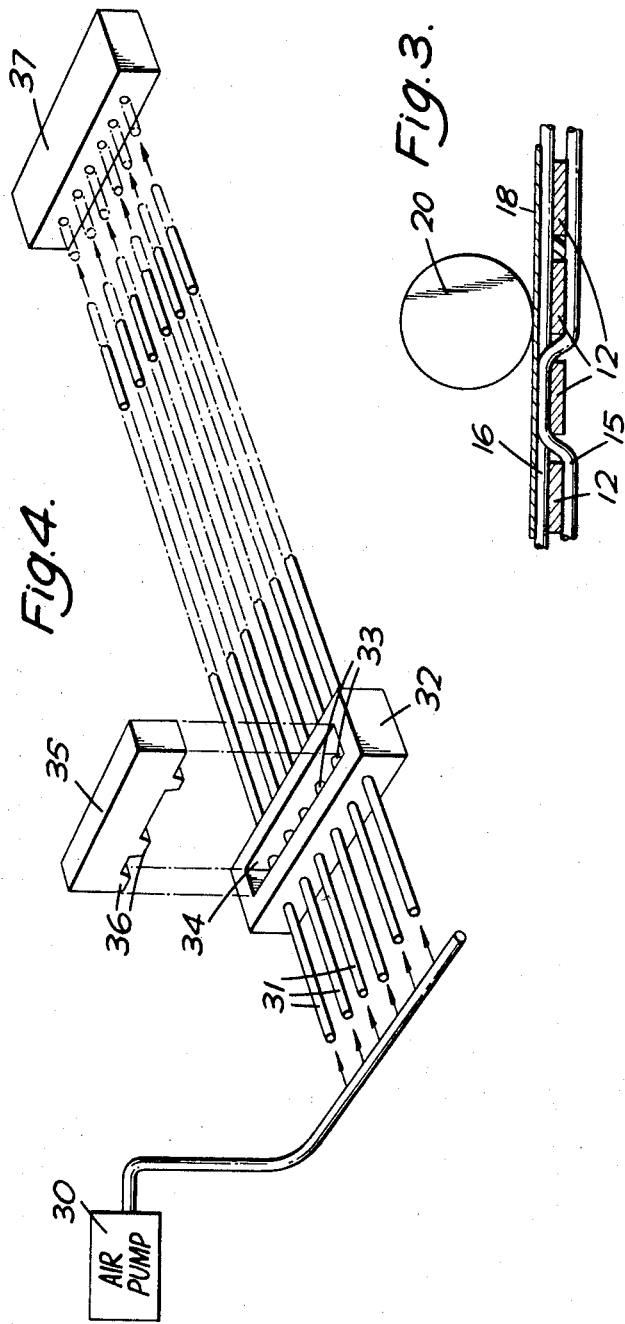

3,521,670
DIGITIZERS FOR FLUID LOGIC SYSTEMS
James Stewart Johnston, Bognor Regis, England, assignor to Rosemount Engineering Company Limited, Sussex, England, a British company
Filed Oct. 21, 1968, Ser. No. 769,181
Claims priority, application Great Britain, Oct. 25, 1967, 48,569/67
Int. Cl. F16k *11/10;* G06m *1/12*
U.S. Cl. 137—552                                17 Claims

ABSTRACT OF THE DISCLOSURE

A digitizer for a fluid logic system comprises a number of tubes of resilient material, a fluid source or sources connected to the tubes at one end thereof for providing a fluid flow through the tubes and a flow detector for detecting flow through each tube, in combination with means for applying pressure, at a location along the length of the tubes, to selected tubes so that the selected tubes are compressed to restrict or inhibit fluid flow therethrough and thereby give distinctive indications in the flow detectors for those tubes. It is thus possible at the ends of the tubes of information for example of the location at which pressure is applied by arranging the tubes so that they are compressed against abutments in a distinctive manner which varies along the lengths of a set of tubes.

BACKGROUND OF THE INVENTION

Field of the invention

This invention relates to digitizers for fluid logic systems.

The invention has particular application to providing an improved form of linear digitizer for giving an output signal in digital form representative of the position of a movable body. It may be used for giving an indication of position along a straight or curved line; by indicating position along a circular arc, the device can be used as an angular position digitizer. The invention however is not confined to a linear digitizer and may be used for transmitting digitally coded information; for example, for transmitting information such as identity by the use of appropriate keys.

As will be apparent from the following description, however, the invention finds particular application in the determination of the position of a massive body, for example the position of a box or pallet on a conveyor belt or the position along a gantry of the lifting gear of a crane, since the moving part of the digitizer may very conveniently be a loaded wheel or roller moving along a track which may be straight or curved.

Prior art

Heretofore in fluid system transducers for sensing the presence of an article, it has been necessary to have orifices or valves through which a fluid, commonly air, can escape. Such transducers suffer from the drawback that dirt can enter the fluid system at exposed orifices or valves.

SUMMARY OF THE INVENTION

According to one aspect of this invention, a digitizer for a fluid logic system comprises a number of tubes of resilient material, a fluid source or sources connected to the tubes at one end thereof for providing a fluid flow through the tubes and a flow detector for detecting flow through each tube, in combination with means for applying pressure, at a location along the length of the tubes, to selected tubes so that the selected tubes are compressed to restrict or inhibit fluid flow therethrough and thereby give distinctive indications on the flow detectors for those tubes.

According to another aspect of the invention, a linear digitizer for a fluid logic system comprises a number of tubes of resilient material extending along the path along which the position of a moving element is to be indicated, a fluid source or sources connected to the tubes at one end thereof for providing a fluid flow through the tubes, and a flow detector for detecting flow through each tube, the various tubes being arranged with respect to abutment members so that, when said element applies pressure to said tubes, at any point along the length of the path, selected tubes are compressed to restrict or inhibit fluid flow therethrough and thereby give distinctive indications on the flow detectors for those tubes, the pattern of abutment members changing along the path whereby the outputs from the detectors is representative of the position along the path of said element.

The tubes may be between the movable element and the abutment members which give the distinctive coding or the movable element may be arranged to press suitably shaped abutment members against the tubes. In a simple form, one of the tubes might pass alternately over and under a series of fixed abutment members which are spaced apart at even intervals thereby giving an indication which changes alternately from one state to another and which can represent in binary form the lowest significant digit of the position of the element in a binary code. The next tube might pass over wider abutment members spaced at twice the interval of the first set of abutments so as to give a binary digit of the next highest significance and so on. As in other digitizers, it is preferable to arrange the abutments so that the output is in the form of a reflected code, e.g. a Gray code, to avoid ambiguities otherwise present when more than one digit is required to change at any given transition.

In one arrangement, the abutments comprise a series of parallel members extending transversely across the path and each tube is threaded to pass over some of these abutment members and under others. Preferably these abutment members comprise a series of members identical with one another and evenly spaced along said path. The abutment members may be relatively wide with spacing between them only just sufficient to permit the tubes to pass through and thus, for practical purposes, the aforementioned tubes will be compressed by the movable element except when the tubes pass underneath these abutments. A flexible sheet of metal or plastic may be provided between the element and the tubes and this will serve to ensure that the appropriate tubes (i.e. those over an abutment or bridging a gap) remain compressed even when the element is passing over the gaps between the tubes. This sheet also minimises any possible damage to the tubes as a result of the movement of the element. The element is preferably a roller arranged to roll along the path; it is readily possible to ensure that a roller is heavy enough or is loaded so as to compress the tubes which are conveniently made of rubber or other elastomer.

Conveniently the tubes are operated pneumatically with an air pump but other fluids can be used if desired.

The flow detectors may be at the same ends of the tubes as the fluid supply source or sources; in this case, the constriction of a tube will cause a rise in pressure at the detector. Alternatively the flow detectors may be at the opposite ends of the tubes to the supply source or sources so that a constriction causes a fall of fluid pressure. In this latter case, preferably between the end of the path (or, more generally, the ends of the lengths of tube used for producing signals) and the aforementioned detectors, a bleed is provided for each tube to cause flow through the tubes and thereby ensuring that the pressure at the detector falls immediately the flow through the tube is restricted.

Although it has been convenient to refer to the tubes being fed at one end and having the detectors at the other end, it will readily be appreciated that the tubes may, for example, extend back along the path so that the source or sources of fluid pressure and the detectors are located adjacent one another.

It will be seen that with the digitizing system described above, there are no exposed orifices to be opened and closed at the point of digitization and thus this system suffers far less from accumulation of dirt compared with systems of the type known heretofore in which orifices or valves had to be opened.

As previously explained, the abutment surfaces for coding the position of the movable element may be arranged between the movable element and the tubes which in this case, may rest on a flat bed or the abutment members may be arranged on the underside of the tubes so that the tubes are compressed between the element and these abutments. A system in which a shaped member formed to compress specified tubes has advantages for example in that the shaped member forms a key which can be changed readily. Thus a tube system can be made to give output signals indicating the identity of a particular key used to apply pressure to the tubes. Such an arrangement may be used for example in mines or underground railways where an alarm box may have a key to identify the position of the alarm which is operated and where individual operators may have their own key which can be inserted in an alarm box to transmit their identity.

It will be seen that this form of fluid logic digitizer finds particular applications in mines and the like for providing a digital position indicating system giving indications to a remote point without any electrical circuits and thereby minimizing any fire risk.

Another application of the invention is in a keyboard musical instrument where the outputs of the detectors may be used as a digital control of sound producing apparatus to produce the required sounds in response to the operation of keys of a keyboard.

BRIEF DESCRIPTION OF THE DRAWINGS

FIG. 1 is a perspective view partly cut away showing part of a track on which the position of a roller is digitized;

FIG. 2 is a diagram for illustrating the fluid system for the position digitizer of FIG. 1;

FIG. 3 is a side elevation of part of the apparatus shown in FIG. 1; and

FIG. 4 illustrates a key-operated digitizer.

DESCRIPTION OF THE PREFERRED EMBODIMENTS

Referring to FIGS. 1 to 3, a track is formed with two main frame members 10, 11 across which extend a number of rigid plates 12. These plates are of identical dimensions along the length of the track and are evenly spaced, the gaps between them being small compared with their length along the track. In FIG. 1 four tubes 13, 14, 15, 16 are illustrated. These tubes are formed of rubber or other elastomer and each extends along the whole length of the track, the various tubes being threaded so as to pass sometimes above and sometimes below the plates 12. The tubes 13–16 are covered by a flexible metal or plastic sheet 18. The element whose position is to be digitized is shown in FIGS. 1 and 3 as a roller 20.

Referring to FIG. 2, each tube, such as the tube 13 is fed at one end from an air pump 22. At the other end there is provided a bleed 23 from a chamber 24 and a pressure change detector consisting of a fluid logic trigger circuit 25 providing an output signal at 26 according to the pressure level at that end of the tube. When the roller 20 compresses a tube by pressing down on the sheet 18 to force the tube against one of the members 12, the flow through the tube is restricted and hence the pressure will drop at the fluid logic trigger circuits 25. The various tubes 13–16 are so arranged on their support members 12 that the pattern of output signals of the detectors for the various tubes is a binary digital representation of the position of the roller 20 along the track. A reflected code is used so that at each transition from one member 12 to the next, only one of the tubes 13–16 changes from a position below to a position above an adjacent member.

FIG. 4 illustrates a key-operated digitiser such as might be employed in a mine. An air pump supplies air to a number of tubes 31 which may extend along the passages of a mine. At appropriate points, alarm boxes such as the box 32 are provided. This box consists essentially of a hollow structure through which the tubes pass, the portions 33 of the tubes in the box being of resilient material. The tubes 31 outside the box may be of similar resilient material or of other material, e.g. metal tubes. One face of the box is shaped to have a slot 34 forming a guide for a removable key 35 which can be inserted into the box through the slot. The key has projections 36 which abut against selected tubes so that, when the key is pressed into the slot, a digitally coded signal is given by a detector 37 connected to the end of the tubes 31 remote from the pump 30. Individual operators may have their own key so that they can insert it in any alarm box to transmit their identity. Alternatively or additionally, each alarm box may have a distinctive key so that information identifying a particular alarm box can be transmitted.

I claim:

1. A digitizer for a fluid logic system comprising a number of tubes of resilient material, a fluid source or sources connected to the tubes at one end thereof for providing a fluid flow through the tubes and a flow detector for detecting flow through each tube, in combination with means for applying pressure, at a location along the length of the tubes, to selected tubes so that the selected tubes are compressed to restrict or inhibit fluid flow therethrough and thereby give distinctive indications on the flow detectors for those tubes.

2. A digitizer as claimed in claim 1 wherein the tubes rest on a flat bed and wherein a shaped key is provided to compress specified tubes.

3. A digitizer as claimed in claim 2 wherein guide means are provided for locating the key with respect to the tubes.

4. A digitizer as claimed in claim 2 wherein the key is removable.

5. A digitizer as claimed in claim 1 wherein the tubes are operated pneumatically.

6. A digitizer as claimed in claim 1 and having said fluid source or sources connected to said tubes at one end thereof and the flow detectors connected to said tubes at the opposite end thereof.

7. A digitizer as claimed in claim 6 wherein, between the ends of the lengths of the tube used for producing signals and the aforesaid detectors, a bleed is provided for each tube to cause flow through the tubes.

8. A digitizer as claimed in claim 1 wherein each detector is responsive to a fall in pressure.

9. A digitizer as claimed in claim 1 wherein the flow detectors are connected to said tubes at the same ends thereof as said fluid source or sources and are responsive to reduce flow when the tubes are constricted.

10. A linear digitizer for a fluid logic system comprising a number of tubes of resilient material extending along the path along which the position of a moving element is to be indicated, a fluid source or sources connected to the tubes at one end thereof for providing a fluid flow through the tubes, and a flow detector, for detecting flow through each tube, the various tubes being arranged with respect to abutment members so that, when said element applies pressure to said tubes, at any point along the length of the path, selected tubes are compressed to restrict or inhibit fluid flow therethrough and thereby give distinctive indications on the flow detectors for those tubes, the pattern of abutment members changing along the path whereby the outputs from the detectors is representative of the position along the path of said element.

11. A linear digitizer as claimed in claim 10 wherein the tubes are between the movable element and the abutment members.

12. A linear digitizer as claimed in claim 11 wherein there are a series of abutment members spaced along said path, each tube passing over some of these abutment members and under others.

13. A linear digitizer as claimed in claim 12 wherein the abutment members comprise a series of members identical with one another and spaced along said path.

14. A linear digitizer as claimed in claim 12 wherein one tube passes alternately over and under successive abutment members, the next tube passes alternately over and under pairs of abutment members and so on.

15. A linear digitizer as claimed in claim 10 wherein the movable member is arranged to press suitably shaped abutment members against the tubes.

16. A linear digitizer as claimed in claim 10 wherein the abutment members are arranged so that the output is a reflected code whereby only one digit changes at any given transition.

17. A linear digitizer as claimed in claim 10 wherein a flexible sheet is provided between said element and said tubes.

References Cited

UNITED STATES PATENTS

| | | | |
|---|---|---|---|
| 2,931,387 | 4/1960 | Fleming | 251—9 XR |
| 3,312,238 | 4/1967 | Voit | 137—552.5 |

OTHER REFERENCES

IBM Technical Disclosure Bulletin, vol. 5, No. 7, December 1962 (Morris).

HENRY T. KLINKSIEK, Primary Examiner

U.S. Cl. X.R.

116—65; 235—201; 137—81.5, 594, 608; 251—6